W. BREWSTER.
WIND SHIELD FOR MOTOR VEHICLES.
APPLICATION FILED JUNE 13, 1917.
1,258,528.
Patented Mar. 5, 1918.
2 SHEETS—SHEET 1.
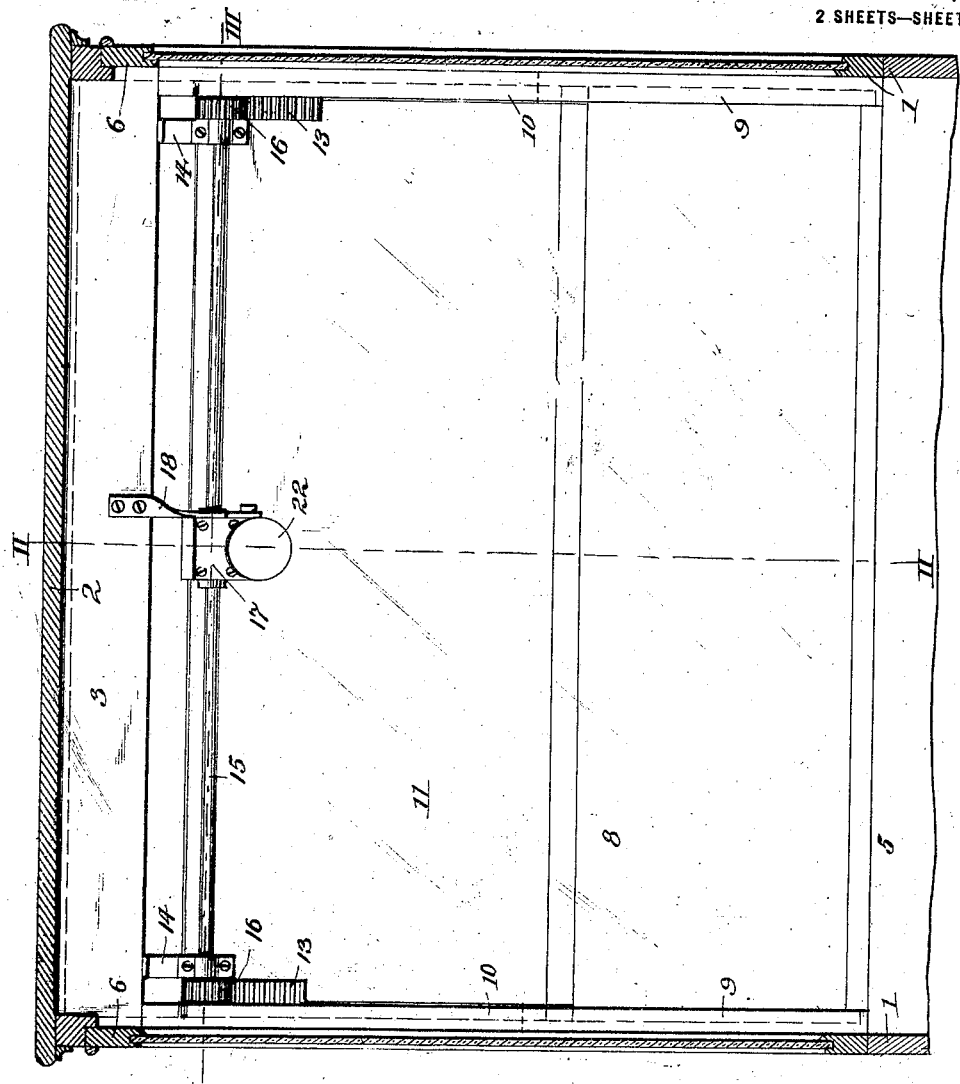
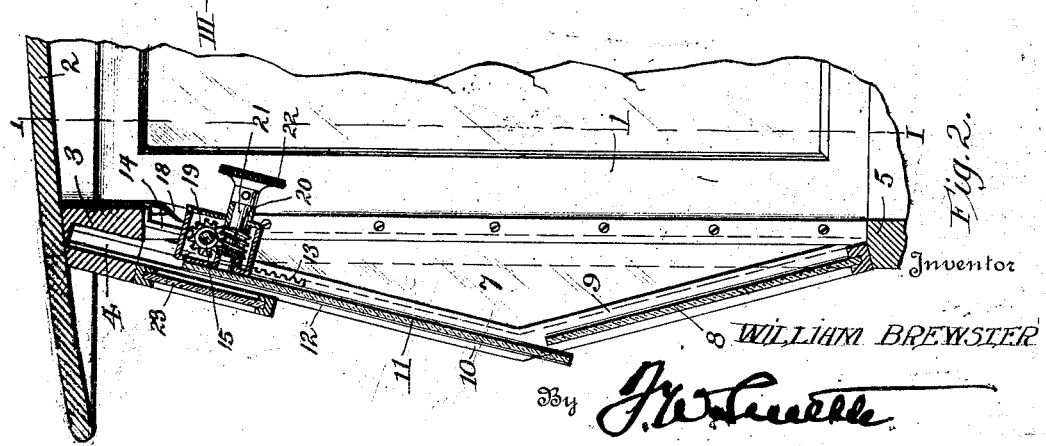
Inventor
WILLIAM BREWSTER
By
Attorney W. BREWSTER.
WIND SHIELD FOR MOTOR VEHICLES.
APPLICATION FILED JUNE 13, 1917.
1,258,528.
Patented Mar. 5, 1918.
2 SHEETS—SHEET 2.
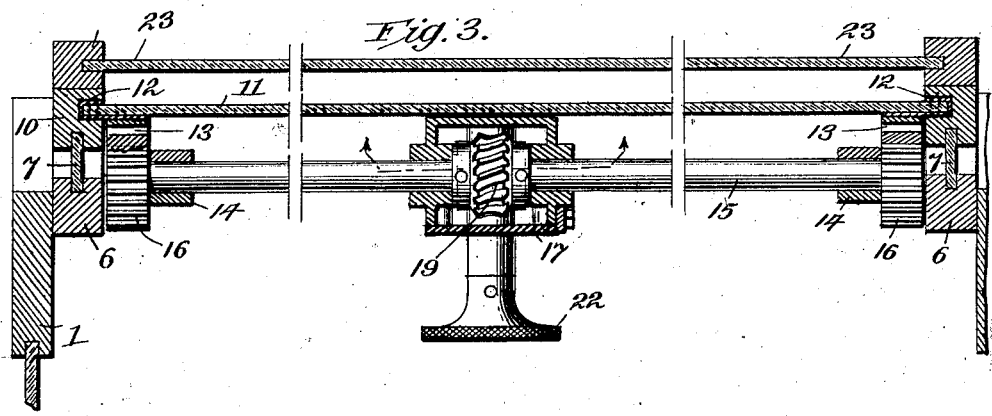
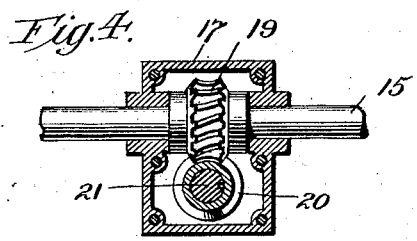
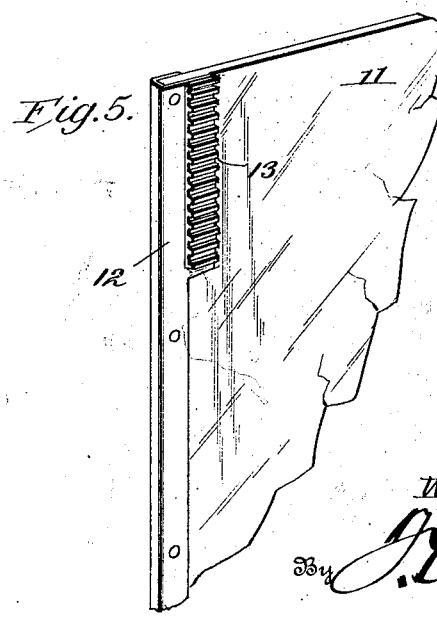
Inventor
WILLIAM BREWSTER
By

UNITED STATES PATENT OFFICE.

WILLIAM BREWSTER, OF NEW YORK, N. Y.

WIND-SHIELD FOR MOTOR-VEHICLES.

1,258,528.  Specification of Letters Patent.  Patented Mar. 5, 1918.

Application filed June 13, 1917. Serial No. 174,520.

*To all whom it may concern:*

Be it known that I, WILLIAM BREWSTER, a citizen of the United States, residing at the city of New York, county of New York, and State of New York, have invented certain new and useful Improvements in Wind-Shields for Motor-Vehicles; and I do declare the following to be a full, clear, and exact description of the invention, such as will enable others skilled in the art to which it appertains to make and use the same.

My present invention pertains to improvements in windshields for motor vehicles, the construction and advantages of which will be hereinafter set forth.

Windshields of various types have heretofore been proposed and used with greater or less success, but it is a well-known and recognized fact that in rainy or snowy weather the operator's vision through the wet glass is materially impaired and it becomes essential to swing the glass and its supporting frame outwardly to obtain an unobstructed view. The swinging of the glass, in order to obtain a proper and clear range of vision, necessarily produces a wide opening directly into the car, with the consequence that the rain and snow will drive in so that under such conditions the shield is of questionable value.

The present invention has for its object the production of a shield which obviates these difficulties and objections and which, while providing a clear line or field of vision, effects the same with a minimum amount of opening or separation between the contiguous edges of the shield.

A still further object resides in the special placement or angular arrangement of the shield elements, so as to preclude, to a greater or less extent, the formation of eddies or currents which would otherwise have the effect of passing directly through the opening, carrying the rain or snow therewith.

A still further object of the invention resides in the means employed for raising and lowering the movable glass or plate, which means may be readily operated from within the car, and which will be automatically locked in its adjusted position.

One embodiment of the invention is shown in the annexed drawings, wherein:

Figure 1 is a longitudinal sectional view, taken on the line I—I of Fig. 2, looking from the interior of the car;

Fig. 2 a transverse vertical sectional view, taken on the line II—II of Fig. 1;

Fig. 3 a horizontal sectional view, taken on the line III—III of Fig. 1;

Fig. 4 a detail view of a portion of the actuating mechanism for raising and lowering the movable element of the windshield; and Fig. 5 a detail perspective view of the movable element of the shield and one of the racks carried thereby.

In the drawings, 1 denotes a portion of the body of an automobile or motor-car, and 2 the top thereof, a cross-rail 3 underlying the top at the forward portion of the body 1. Said rail is provided with a recess 4, extending from the under face upwardly and inclining rearwardly toward its upper side or edge.

Secured at each end of the cross-rail 3 to the frame or body 1 and to a lower cross-rail 5, is a side frame 6, triangular in outline and carrying a pane or window 7. Closing the space between the two side frames 6 is a fixed pane or plate 9, of glass which, as will be seen upon reference to Fig. 2, inclines outwardly toward its upper end and terminates short of the junction between the two forward members 9 and 10 of the frame 6. The members 10 of said frame are recessed or grooved in their oppositely-disposed faces to receive the sliding plate 11 of the windshield. Said plate is provided with metal bindings 12 along the vertical edges thereof, and to the upper portion of each of said bindings is secured a rack 13. The grooves in the members 10 are in alinement with the recess 4 in the cross-rail 3, so that the plate 11, with its binding and rack, may be moved upwardly into the same when the plate 11 is elevated.

When the parts are in their closed position, the lower edge of the plate 11 passes beyond and overlaps the upper edge of the plate 8, as shown in Fig. 2.

To effect the raising and lowering of the plate 11, any suitable mechanism may be employed, but I prefer to utilize that shown herein. Secured to the cross-rail 3 is a pair of hangers 14, in which is journaled a shaft 15, carrying at each end a pinion 16, which pinions mesh with the respective racks 13 at each end of the plate 11. The shaft 15 passes through a box or housing 17, held against movement by a strap or hanger 18, secured to and extending downwardly from the cross-rail 3.

Shaft 15 also carries a worm-wheel 19, which is in mesh with a worm 20, secured upon a stub-shaft 21, mounted in suitable bearings in the box or casing 17. The shaft 21 extends outwardly into the car for a short distance, and a hand-wheel or knob 22 is secured thereto, through the manipulation of which the occupant of the car may raise and lower the movable plate 11. As will be readily appreciated, by turning the knob of wheel 22, motion will be imparted to the shaft 15, through the worm and worm-wheel, and pinions 16 meshing with the racks 13 will raise or lower the plate 11, and this without any binding or cramping of the plate in its guide-ways. In other words, power being applied at each end of the plate to raise and lower the same, there is no possibility of the plate tipping or cramping.

A glazed transom 23, Figs. 2 and 3, is secured below the cross-rail 3, and in front of the guide-rails 10, in order to close the opening which would otherwise be left above the upper edge of the plate 11, when said plate is in its lowered position.

By moving the plate 11 in a right line, instead of swinging the lower edge of the same outwardly about a pivot located at or adjacent its upper portion, I am enabled, with the minimum amount of movement of the plate and with, consequently, the minimum opening between the edges of the plates 8 and 11, to obtain a clear line of vision, whereas, with a swinging plate, one necessarily has to move it through a considerable arc before the proper clearance can be obtained. The swinging movement, therefore, necessitates a relatively wide opening or space between the lower edge of the swinging plate and the contiguous fixed element, with the consequence that the rain and snow will beat inwardly through such side opening.

With the present structure, having fixed and movable elements arranged in relation to each other as herein shown, and the movable element bodily adjustable in a right line, or in the plane of its disposition, I find that a clear vision may be obtained with a minimum amount of opening or clearance between the fixed and movable elements, and that the air-currents set up do not carry the rain inwardly through the opening, but on the contrary, they tend to cause it to swirl away from such opening.

Having thus described my invention, what I claim is:

1. In combination with a motor vehicle body, a wind-shield located at the forward end thereof, said shield having an upper member inclining forwardly toward its lower edge and serving, by reason of such inclination, to cause the impinging air to pass away from the lower edge of said member; and means for bodily raising and lowering said member in line with its plane of angular disposition.

2. In combination with a motor vehicle, a wind-shield therefor, comprising an upper member inclining forwardly toward its lower edge, means for bodily raising and lowering said member in line with its plane of angular disposition, and a fixed member located below the upper member, said fixed member inclining forwardly toward its upper edge.

3. In combination with a motor vehicle, a wind-shield therefor, comprising an upper member inclining forwardly toward its lower edge, means for bodily raising and lowering said member in line with its plane of angular disposition, and a fixed member located below the upper member, said fixed member inclining forwardly toward its upper edge, which edge underlies the upper member when the latter is in its closed position.

4. A windshield for vehicles, comprising, in combination, a lower fixed pane; an upper, movable pane, the lower edge whereof, when the parts are closed, overlaps the lower pane; and means for raising said movable pane bodily in its plane of disposition.

5. A windshield for vehicles, comprising, in combination, two elements, said elements lying in oppositely-inclined planes and converging toward each other; and means for moving one of said elements bodily in its plane of disposition toward and from the other element.

6. A windshield for vehicles, comprising, in combination, two panes, said panes lying in oppositely-inclined planes, and converging toward each other, the lower edge of the uppermost pane overlapping the upper edge of the lower pane; and means for moving the upper pane bodily in line with its plane of disposition.

7. A windshield for vehicles, comprising, in combination, two triangular side fames, with the apices thereof extending forwardly; a fixed pane, overlying the space between the lower inclined edges of said frames; a second pane normally closing the space between the upper inclined edges of the frames; and means for bodily raising and lowering said second pane in its plane of disposition.

8. In combination with a motor vehicle, a wind-shield therefor comprising oppositely-disposed frames triangular in form, secured at each side of the forward portion of the vehicle, with the apices extending forwardly; a pane bridging the space between the lower angularly-disposed sides of the frames; a second pane closing the space between the upper angularly-disposed sides of the frames, the lower edge of said upper pane overlapping the upper edge of the lower pane; and means for moving the upper pane in its plane of disposition toward and from the lower pane.

In testimony whereof I affix my signature in presence of two witnesses.

WILLIAM BREWSTER.

Witnesses:
 PHILIP B. BREWSTER,
 LEONE MENICHETOR.